United States Patent
Kaneko

(12) 
(10) Patent No.: US 10,855,540 B2
(45) Date of Patent: Dec. 1, 2020

(54) SYSTEM AND METHOD FOR POLICY BASED NETWORKED APPLICATION MANAGEMENT

(71) Applicant: Hitachi, Ltd., Tokyo (JP)

(72) Inventor: Satoshi Kaneko, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 15/969,621

(22) Filed: May 2, 2018

(65) Prior Publication Data

US 2019/0342174 A1 Nov. 7, 2019

(51) Int. Cl.
| | |
|---|---|
| *H04L 12/24* | (2006.01) |
| *G06F 21/60* | (2013.01) |
| *H04L 29/06* | (2006.01) |
| *G06F 21/62* | (2013.01) |
| *G06F 8/71* | (2018.01) |

(52) U.S. Cl.
CPC ............ *H04L 41/0893* (2013.01); *G06F 8/71* (2013.01); *G06F 21/604* (2013.01); *G06F 21/629* (2013.01); *H04L 63/102* (2013.01); *H04L 63/107* (2013.01); *H04L 63/20* (2013.01)

(58) Field of Classification Search
CPC . H04L 41/0893; H04L 63/102; H04L 63/107; H04L 63/20; G06F 8/71; G06F 21/604; G06F 21/629
See application file for complete search history.

(56) References Cited

U.S. PATENT DOCUMENTS

| | | | |
|---|---|---|---|
| 7,340,770 B2* | 3/2008 | Freund ................ | H04L 63/0227 726/11 |
| 9,229,700 B2* | 1/2016 | Subramanya ............ | G06F 8/65 |
| 2007/0156659 A1* | 7/2007 | Lim .................... | H04L 41/0893 |
| 2016/0112497 A1* | 4/2016 | Koushik ................. | G06F 8/61 726/7 |
| 2018/0241751 A1* | 8/2018 | Kruse .................... | H04L 63/08 |
| 2019/0190799 A1* | 6/2019 | Chatterjee ........... | H04L 41/5054 |
| 2019/0342174 A1* | 11/2019 | Kaneko ................ | G06F 21/629 |

* cited by examiner

*Primary Examiner* — Ayoub Alata
(74) *Attorney, Agent, or Firm* — Procopio, Cory, Hargreaves & Savitch LLP

(57) ABSTRACT

Example implementations described herein are directed to systems and methods for policy based management of access to networked applications in compliance with rules or policies. An example implementation includes a method to manage access to a program where in response to receiving a request, the method identifies a source location indicated by program information and a destination location indicated by user information, determines a rule type based on the source location and the destination location, determines a rule for the program based on the source location, the destination location, and the rule type, applies a procedure to approve access based on the rule; and allows access to the program based on successful completion of the procedure.

16 Claims, 11 Drawing Sheets

|  | ID | Name | Group | Location | Nationality |
|---|---|---|---|---|---|
| 242A | 1 | A | D | USA | USA |
| 242B | 2 | B | E | JP | JP |
| 242C | 3 | C | n/a | USA | IN |
| 242N | : | : | : | : | : |

FIG. 3

| | ID | Source Location | Destination Location | Rule Type | Rule |
|---|---|---|---|---|---|
| 241A | 1 | USA | JP | Export | • Pass Checklist A<br>• Pass Workflow A<br>• If an access of the program is managed to be accessible from only the USA, then do not apply this rule. |
| 241B | 2 | JP | USA | Export | • Pass Checklist B<br>• Pass Workflow B<br>• Need re-application of the rule when the program is updated |
| 241C | 3 | JP | UK | Export | : |
| 241N | : | : | : | : | : |
| | : | : | : | : | : |

FIG. 4

| ID | Type | Link |
|---|---|---|
| 1 | Checklist | http://aaa.aaa.aaa... |
| 2 | Workflow | http://bbb.bbb.bbb... |
| 3 | : | : |
| 4 | : | : |
| : | : | : |

FIG. 5

| | ID | Developer | Repository URL | Access location | Repository type | Original program ID | Source Location |
|---|---|---|---|---|---|---|---|
| 243B | 1 | 1 | http://xxx.xxx... | USA, JP | Master | n/a | JP |
| 243C | 2 | 2 | http://yyy.yyy... | Global | Master | n/a | USA |
| 243N | 3 | 3 | http://zzz.zzz... | UK | Clone | 2 | UK |
| | : | : | : | : | : | : | : |

FIG. 6

| ID | Program ID | User | Rule | Expiration Date |
|---|---|---|---|---|
| 1 | 1 | 1 | 2 | 12/01/2020 |
| 2 | 2 | 2 | 5 | 09/01/2019 |
| : | : | : | | |

FIG. 7

SYSTEM AND METHOD FOR POLICY BASED NETWORKED APPLICATION MANAGEMENT

BACKGROUND

Field

The present disclosure relates generally to systems and methods for networked application management, and more specifically, to policy based networked application management.

Related Art

Export management and compliance is required by various governments to ensure that companies comply with export control policies (e.g., national security, environmental requirements, economic tariffs, etc.) with different regulations based on the type of information or product being shared, where the information or product originates, and/or where the information or product is being shared or shipped. If the regulations are not followed, government regulators can impose hefty fines against companies and penalize individuals involved at all levels with fines and imprisonment.

Related art implementations for export management require several managers to spend an inordinate amount of time and effort to process access requests. For example, related art approaches for sharing applications between geographic regions can involve a large number of different people in an organization to receive access requests, gather user information, determine whether the access requests complies with regulatory and business policies to manage access control. Typically, managers or users with access to factual information have limited knowledge or familiarity with the regulations. Companies employ compliance specialist to process requests with limited access to factual information and may be unfamiliar with programs associated with the requests.

The related art implementations for export management cause a considerable amount of re-work due to ineffective access to information. Further, frequent policy and regulatory changes requires costly audits to discover whether previously authorized access to programs comply with new or updated policies and regulatory rules. The complexity of international organizations require effective tools for granting access to networked software that to comply with a quagmire of regulations from different countries to avoid significant penalties and/or potential imprisonment.

SUMMARY

An example implementation includes a method to manage access to programs where in response to receiving a request, the method identifies a source location indicated by program information and a destination location indicated by user information, determines a rule type based on the source location and the destination location, determines a rule for the program based on the source location, the destination location, and the rule type, applies a procedure to approve access based on the rule, and allows access to the program based on successful completion of the procedure.

Aspects of the present disclosure can include a system with a memory and processing device configured to manage access to programs where in response to receiving a request, the system identifies a source location indicated by program information and a destination location indicated by user information, determines a rule type based on the source location and the destination location, determines a rule for the program based on the source location, the destination location, and the rule type, applies a procedure to approve access based on the rule, and allows access to the program based on successful completion of the procedure.

Aspects of the present disclosure can include a non-transitory computer readable medium storing instructions to manage access to programs where in response to receiving a request, the instructions identify a source location indicated by program information and a destination location indicated by user information, determine a rule type based on the source location and the destination location, determine a rule for the program based on the source location, the destination location, and the rule type, apply a procedure to approve access based on the rule, and allows access to the program based on successful completion of the procedure.

Aspects of the present disclosure can include a means for managing access to programs where in response to receiving a request, the system identifies a source location indicated by program information and a destination location indicated by user information, determines a rule type based on the source location and the destination location, determines a rule for the program based on the source location, the destination location, and the rule type, applies a procedure to approve access based on the rule, and allows access to the program based on successful completion of the procedure.

An example implementation includes a method for access management of program that receives an event of a program and a program identifier, determines a rule assigned to the program based on the program identifier and an application table in view of an event type for the event, applies a procedure to approve access based on the rule, and allows access to the program based on successful completion of the procedure.

Aspects of the present disclosure can include a system with a memory and processing device configured to manage access including receiving an event of a program and a program identifier, determining a rule assigned to the program based on the program identifier and an application table in view of an event type for the event, applying a procedure to approve access based on the rule, and allowing access to the program based on successful completion of the procedure.

Aspects of the present disclosure can include a non-transitory computer readable medium storing instructions to manage access including receiving an event of a program and a program identifier, determining a rule assigned to the program based on the program identifier and an application table in view of an event type for the event, applying a procedure to approve access based on the rule, and allowing access to the program based on successful completion of the procedure.

Aspects of the present disclosure can include a means for managing access to programs where in response to receiving an event of a program and a program identifier, determining a rule assigned to the program based on the program identifier and an application table in view of an event type for the event, applying a procedure to approve access based on the rule, and allowing access to the program based on successful completion of the procedure.

BRIEF DESCRIPTION OF DRAWINGS

FIG. 3 illustrates an example user table in accordance with an example implementation.

FIG. 4 illustrates an example rule table in accordance with an example implementation.

FIG. 5 illustrate example template table in accordance with an example implementation.

FIG. 6 illustrates an example program table in accordance with an example implementation.

FIG. 7 illustrates an example application table in accordance with an example implementation.

DETAILED DESCRIPTION

Figure 1A:
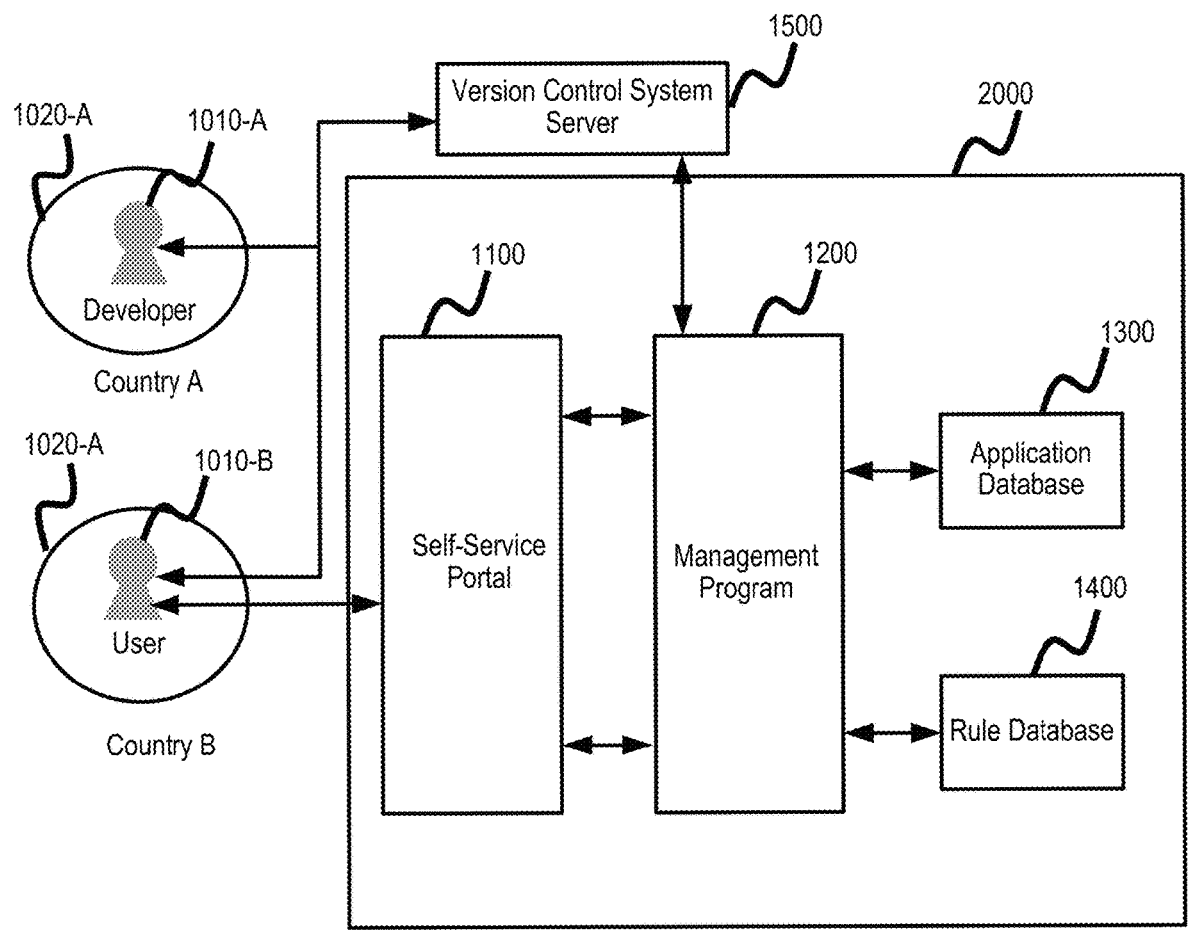
FIGS. 1A-1B illustrate example hardware configurations for an application management system in accordance with example implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In an example implementation, a method to manage access to programs includes receiving a request to access a program, and in response to receiving the request the method identifies a source location indicated by program information and a destination location indicated by user information, determines a rule type based on the source location and the destination location, determines a rule for the program based on the source location, the destination location, and the rule type, applies a procedure to approve access based on the rule, and allows access to the program based on successful completion of the procedure.

Example aspects include how a management program controls access to programs in compliance with rules such as for export control, a company's regulation, etc. An example aspect includes organizing and streamlining a workflow of approvals to share programs across organizations and/or countries. In an example implementation, a developer is responsible for authorizing access to programs by multiple users. An application management system can process requests to share programs with users that include minimal information from the requestor. The application management system uses tables and rules that automatically determine whether access to the program by the user complies with policies and/or regulations and triggers an appropriate approval checklist and workflow based on location information of the user and the program.

In an example implementation, a management program automatically creates a procedure for allowing access to the program (e.g., sharing access, granting permission, instantiating a copy, providing a cloned version, etc.) and updating the program. Example implementations include a management program that manages access to the programs in consideration of rules, for example, polices or regulations.

Rules can be used to determine access to programs by a specific user to comply with, for example an export control, environmental or economic limits, company policies, etc. The management program can include providing a user interface for users to submit a request to access a program from a network, determine a required procedure for sharing access to the program based on the rules, and allows access to the program with the user according to the status of the procedure. The management program further maintains records for users, programs from the network, and successfully completed procedures that indicate access to the programs in compliance with the polices and rules.

In an example implementation, a method for access management of program can include receiving a request that includes program information and user information, identifying a source location indicated by the program information and a destination location indicated by the user information, determining a rule type based on the source location and the destination location, determining a rule for the program based on the source location, the destination location, and the rule type, applying a procedure to approve access based on the rule, and allowing access to the program based on successful completion of the procedure.

The procedure indicates a checklist and a workflow associated with the rule. Successful completion of the procedure can indicate compliance with one or more regulations for a user to access the program between the source location and the destination location. For example, successful completion of the procedure can include obtaining a sequence of approvals for the checklist based on the workflow.

The rule can further indicate whether a re-application of the procedure based on an event type or rule details is needed. The procedure can further be used to configure the program for access in the destination location based on the user information. In an example, the method receives program attributes from a version control system used to configure the program.

In another example implementation, a method for access management of a program can include receiving an event of a program and a program identifier, determining a rule assigned to the program based on the program identifier and an application table in view of an event type for the event, applying a procedure to approve access based on the rule, and allowing access to the program based on successful completion of the procedure.

In an example, the program identifier indicates a version of the program, and the event type indicates to modify, copy, or delete the version of the program. The procedure can further update a program table based on the configuration. The procedure can further be used to configure the program for a user, where a destination location is determined based user information of the user from a user table, and where a source location is determined based on the program identifier in view of a program table. The method can further update the application table based on the event and determine whether to re-apply the procedure based on the event type.

Successful completion of the procedure can indicate compliance with one or more regulations for the user to access the program between the source location and the destination location. For example, the procedure can indicate a checklist and a workflow associated with the rule, and successful completion of the procedure can include obtaining a sequence of approvals for the checklist based on the workflow.

Figure 1B:
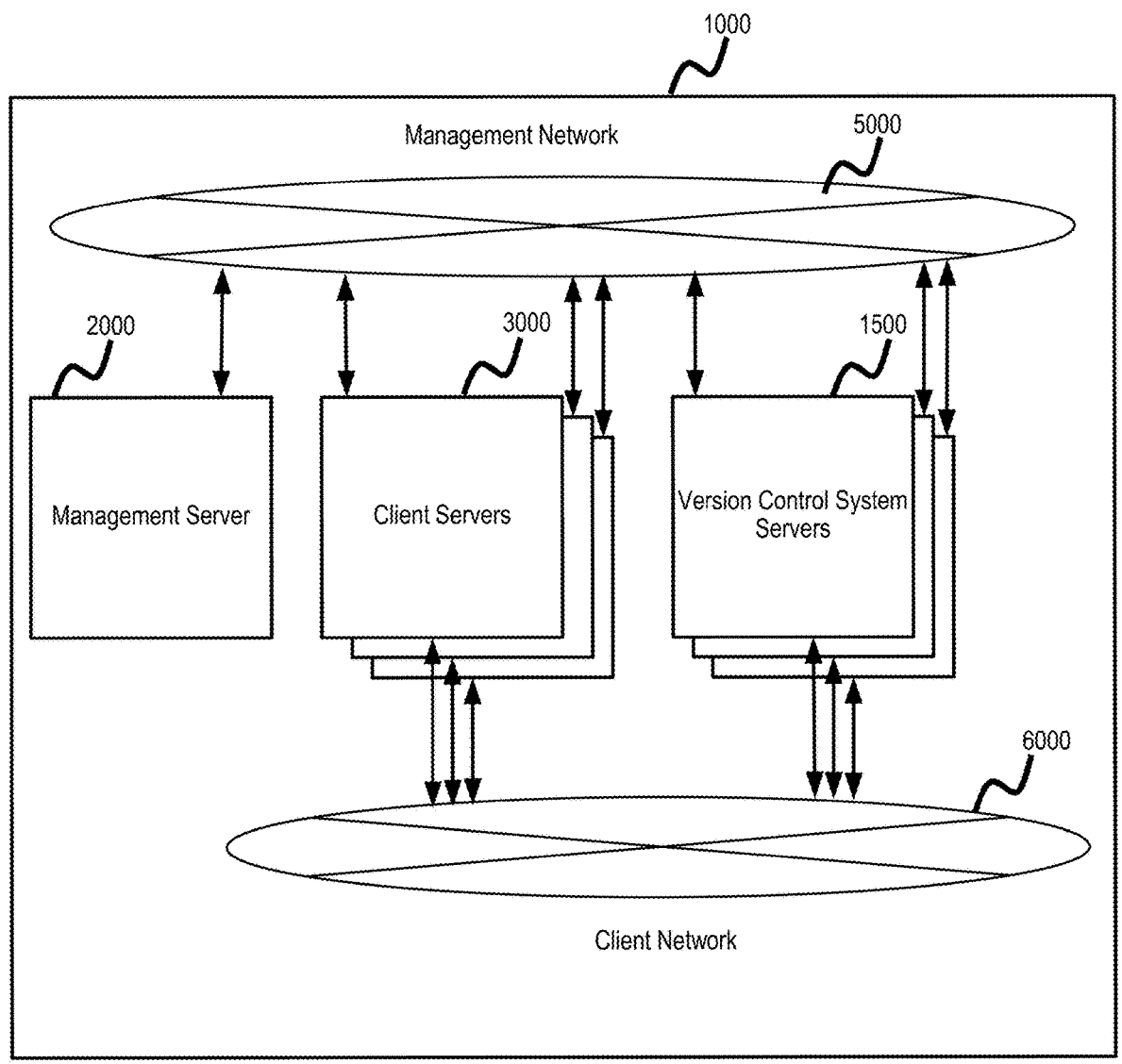

FIGS. 1A-1B illustrate example hardware configurations for an application management system in accordance with example. FIG. 1A illustrates an example of a logical configuration of the system in which the method and apparatus of the invention may be applied. Management server 2000 includes a management program 1200, a self-service portal 1100, an application database 1300, and a rule database 1400.

In an example implementation, a developer 1010-A of organization 1020-A develops programs and registers the programs with a version control system server 1500. Entry of the program in the version control system server 1500 is synchronized with the management program 1200. User 1010-A can submit an application for use of the program to management program 1200 via self-service portal 1100.

Management program 1200 creates a procedure for sharing the program based on the information about the application and rules in rule database 1400. The information about the application is registered into an application database 1300. The information about the application included in application database 1300 is discussed in reference to FIG. 7. Rule information included in rule database 1400 is discussed in reference to FIG. 4.

In an example implementation, management server 2000, client servers 3000, and version control system servers 1500 are illustrated as separate components, but may also be integrated in other example implementations. For example, any server can host a management program (e.g., management program 1200). The management server 2000 is compatible with various types of version control system servers 1500 and can be simultaneously coupled to multiple version control system servers 1500.

A user 1010-B of the organization 1020-A in a different country (e.g., Country B) from developer 1010-A (e.g., different country from where the program was designed or stored) can submit a request to access the program. According to an example implementation, the request can include an identifier associated with user 1010-B and an identifier for the program. The management server 2000 can gather information to determine one or more rules from the rule database 1400 to apply with a compliance procedure for granting access that satisfies a rule for the regulations.

FIG. 1B illustrates an example physical configurations of the system. An information technology (IT) environment 1000 includes a management server 2000, one or more client servers 3000, version control system servers 1500, a management network 5000, and a client network 6000. The client servers 3000 are connected via the client network 6000. The management server 2000, client servers 3000, and version control system servers 1500 are connected via the management network 5000.

The term "communicatively connected" is intended to include any type of connection, wired or wireless, in which data may be communicated. The term "communicatively connected" is intended to include, but not limited to, a connection between devices and/or programs within a single computer or between devices and/or separate computers over the management network 5000 and/or the client network 6000. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (v6LowPAN), power line communication (PLC), Ethernet (e.g., 10 Megabyte (Mb), 100 Mb and/or 1 Gigabyte (Gb) Ethernet) or other communication protocols.

For example, the client network 6000 can be a LAN and management network 5000 can be a WAN, but implementations are not limited thereto. Though client network 6000 and management network 5000 are illustrated as separate networks in the example implementation, the networks can be configured in a single converged network or various combinations as understood by one of ordinary skill in the art.

In an example implementation, a request with minimal information for a user 1010-B in country B to access a program can be received via the self-service portal 1110 by leveraging information in the application database 1300, the rule database 1400, and the version control system server 1500 using management program 1200 to enforce rules and policies (e.g., Export/Import rules). In response to the request for the user 1010-B to access the program, policies and regulations can be enforced via the rules to automate a checklist and workflow of approvals.

Approval to share and/or access the program with the user 1010-B can carried out efficiently with minimal information provided by the requestor to allow managers (e.g., developer 1010-A) in the workflow to quickly and confidently complete the appropriate checklists for the request. Further, the management program 1200 maintains user, application, and program records to ensure compliance with the various policies and regulations as discussed further in reference to FIGS. 8 and 9. The records in the tables can used adapt to changes in regulations and carry out future audits if necessary.

Figure 2:
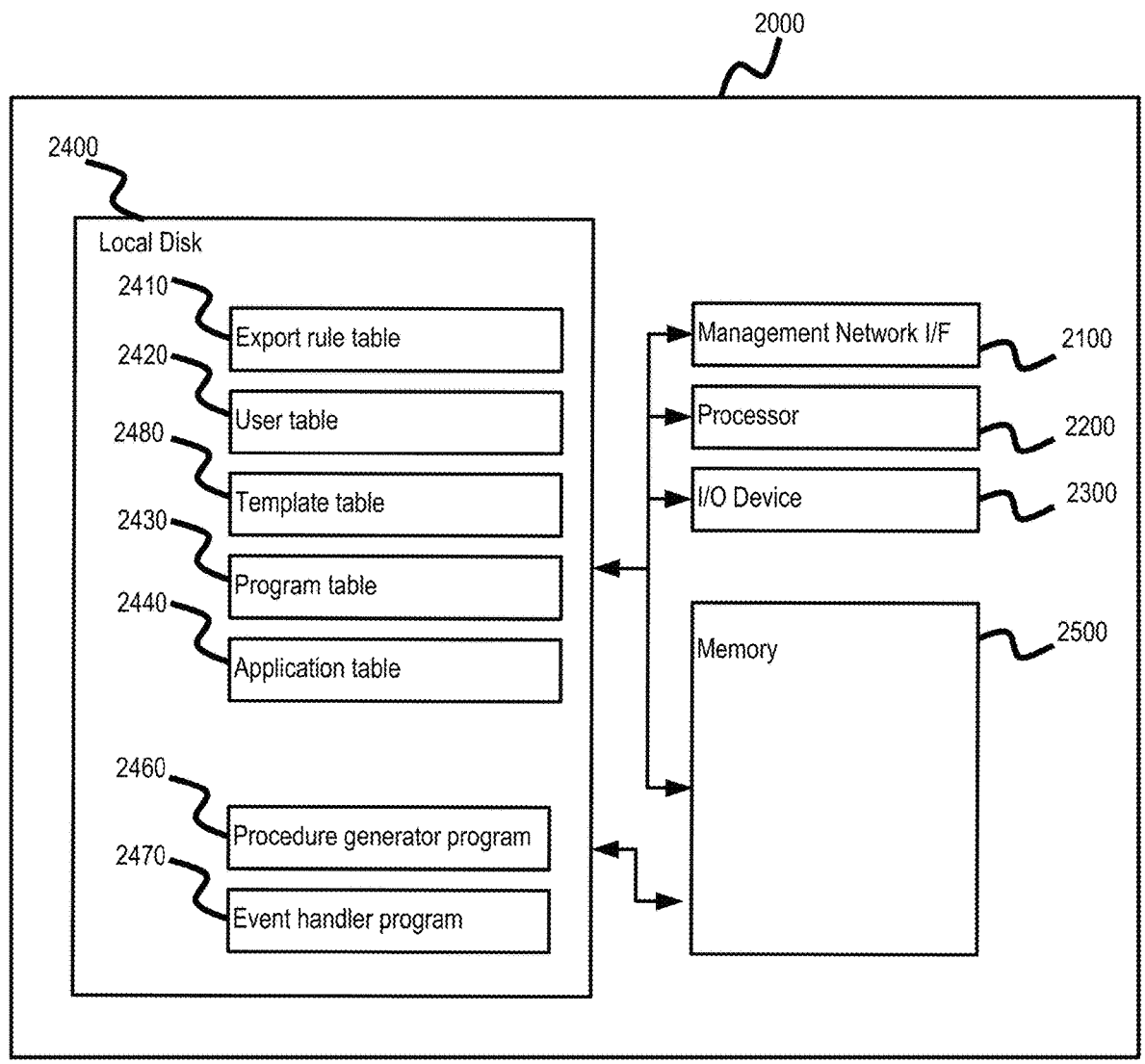
FIG. 2 illustrates an example management server configuration in accordance with an example implementation.

FIG. 2 illustrates an example management server configuration in accordance with an example implementation. A management server 2000 can include a management network interface 2100 that is an interface to connect to the management network 5000. Input and output device 2300 is a user interface such as a monitor, a keyboard, a mouse, etc. The management server 2000 includes a local disk 2400 with a user table 2420, an Export/Import rule table 2410, a template table 2480, a program table 2430, an application table 2440, a procedure generator program 2460, and an event handler program 2470.

According to an example implementation, procedure generator program 2460 or process and event handler program 2470 are loaded to a memory 2500 and executed by a processor 2200. The procedure generator process 2460 and event handler program 2470 operate to automate the process of sharing or granting access to programs while complying with policies and regulations (e.g., Export/Import rules) as discussed in reference to FIGS. 8 and 9.

Management program 1200 of FIG. 1 includes the procedure generator program 2460 and event handler program 2470. The user table 2420, the Export/Import rule table 2410, the template table 2480, the program table 2430, and the application table 2440 are loaded to the memory 2500 for use by the procedure generator process 2460 and event handler program 2470.

FIG. 3 illustrates an example user table 2420 in accordance with an example implementation. The user table 2420 includes information to describe attributes (e.g., group, location, citizenship, etc.) of users to access the programs to apply rules via the procedure generator process 2460 and event handler program 2470. The user table 2420 can include static and dynamic user attributes that are predefined manually, but are not limited thereto. For example, the user table 2420 can be synchronized with user account information in version control system server 1500 by the procedure generator process 2460.

The user table 2420 can include column 2421 that shows identifiers (ID) of each user, column 2422 that shows a name of the user, column 2423 that shows a group of the user (e.g., business group, department, division, etc.), column 2424 that shows a location where the user works (e.g., country of residence, office location, computer location, etc.), and column 2425 that shows a nationality of the user (e.g., country of citizenship). Each row (242A, 242B, 242C, 242N) includes attributes for a different user. For example, row 242A shows that User A with an ID of 1 belong to the group D, and that User A is based in United States of America (USA) with User A's nationality as USA. In row 242C, the group column 2423 shows n/a indicating that User C located in the USA with Indian (IN) nationality is not assigned to a group.

FIG. 4 illustrates an example rule table 2410 in accordance with an example implementation. In an example implementation, rules for compliance with policies and regulations can be associated with international regulations for Export/Import activity as specified in rule table 2410. Export/Import rule table 2410 can be maintained centrally across various groups, departments organizations, etc. with pre-defined rules (e.g., downloaded, manually input, etc.) for the relevant regulations.

Rule table 2410 can include column 2411 that shows an ID of the rule, column 2412 that shows a source location of the program (e.g., country or location where the program was designed or currently stored), column 2413 that shows a destination location of the program (e.g., country where the program can be shared), column 2414 that shows a type of the rule (e.g., trigger associated with the policy or regulation), and column 2415 that shows a content of the rule (e.g., actions to be carried out or verified to comply with the policy or regulation). The content of the rule in column 2415 can indicate one or more checklist and/or workflows for the rule as further discussed in reference to template table 2480 of FIG. 5.

For example, each row (241A, 241B, 241C, 241N) shows the rule for exporting or importing of the program. Row 241A shows that rule 1 is for an export of the program from USA to Japan (JP), and rule 1 shows the program must pass checklist A and workflow A, and if an access of the program is managed to be accessible only from the USA, then these rules aren't applied. In an example, rules in column 2415 can further indicate exceptions to rules (e.g., if an access of the program is managed to be accessible from only the USA, then do not apply the rule) or event based application of the rule (e.g., the rule needs to be re-applied when the program is updated).

If the program which is located in JP and developed in USA will be shared to United Kingdom (UK), an export rule from USA to JP and an export rule from JP to UK are required. In other examples, the rule can based on other classifications or triggers such as a source company or destination company rather than country based laws.

Figure 5:
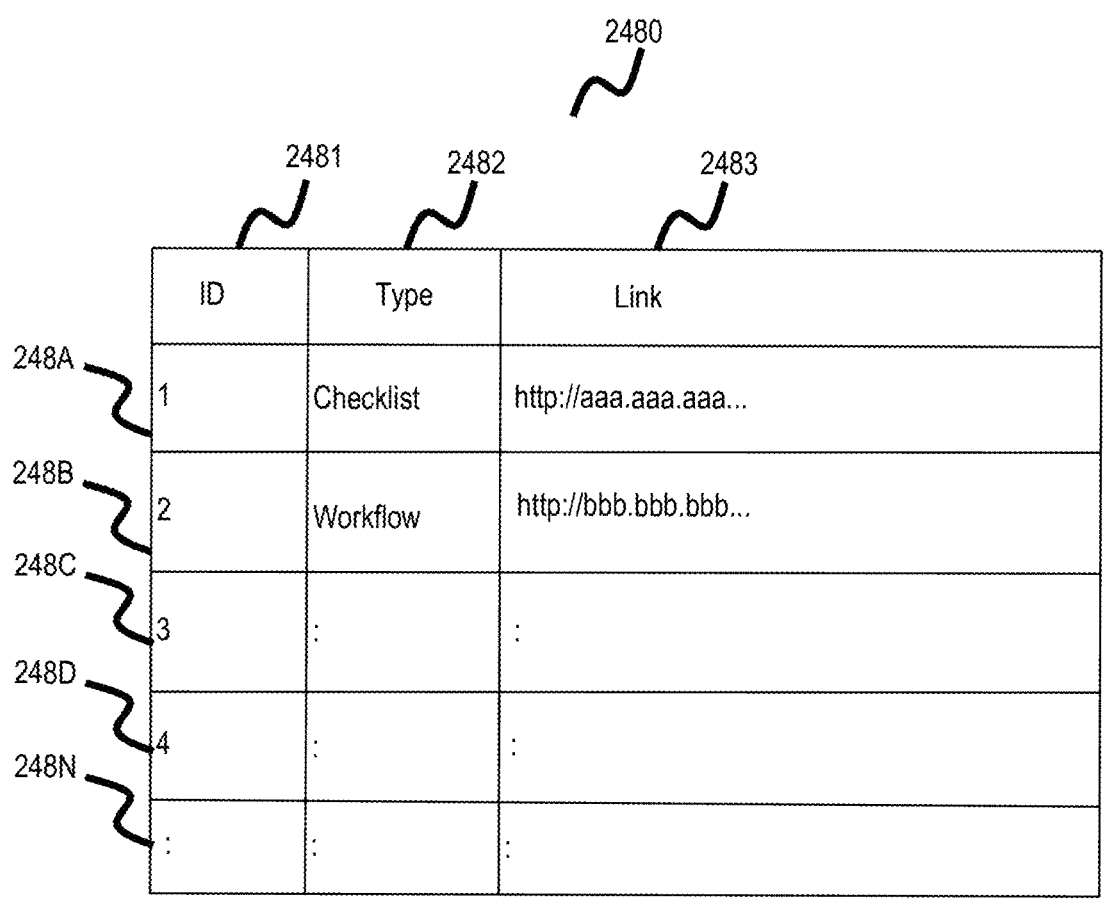

FIG. 5 illustrate example template table 2480 in accordance with an example implementation. The template table 2480 can be created in advance manually, for example by a system administrator. In an example implementation, the template table 2480 is used to provide a checklist to a workflow based on the rules in column 2415 in rule table 2410 of FIG. 4.

The template table 2480 can include column 2481 that shows an ID of the template (e.g., 1, 2, 3, etc.), column 2482 that shows a type of the procedure (e.g., checklist, workflow, etc.), and column 2483 shows a link (e.g., URL) to the procedure. In an example implementation, a developer completes a checklist to verify specific elements of policies or regulations and the checklist is further approved by managers in the workflow.

The template table 2480 can identify the appropriate checklist for a request and trigger or deliver the checklist to the developer. When the developer completes the checklist, the workflow can automate further approval of the checklist based on the associated workflow. The workflow can indicate one or more recipients (e.g., managers, compliance specialists, etc.) to provide upper level approval of the developer checklist.

The application management system reduces the burden on the developer to complete the upper level approval via the workflow. Each row (248A, 248B, 248C, 248D, 248N) shows application information. For example, row 248A shows that template 1 is the procedure with a type of checklist, and a user can execute the procedure by referring to the link "http://aaa.aaa.aaa . . . " in column 2483. For example, the link can connect a developer 1010-A or manager to a stored checklist this is distributed for further approval via a workflow system.

FIG. 6 illustrates an example program table 2430-A in accordance with an example implementation. In an example, program table 2430-A can be synchronized with the program information in version control system server 1500 by procedure generator process 2460, but it is not limited thereto.

Program table 2430-A includes column 2431 that shows an ID of the program, column 2432 that shows a developer of the program, column 2433 that shows a repository location (e.g., a uniform resource locator (URL)) of version control system server 1500, column 2434 that shows a network location where a user can access the program, column 2435 that shows a type of the repository, column 2436 that shows an original program ID of the cloned program, and column 2437 that shows a source location of each program. The network location can be compared to the user location in column 2424 in user table 2420 of FIG. 3. The repository URL can refer to the source location of the program. In an example, a regulation may not restrict access based on geography and indicate global access in column 2434.

Each row (243A, 243B, 243C, 243N) shows the program information. For example, row 243A shows that program 1 is developed by developer 1, and the repository URL is "http://xxx.xxx . . . ", and the program can be accessed from USA and JP, and a type of the repository is Master. Original program ID column in row 243C shows that a program 3 is cloned from a program 2.

In column 2435, different type of the repositories can include master and clones. For example, a master can indicate direct network access to a primary version of the program and a clone can indicate a copied version of the program. For example, a clone can indicate version forks and/or merged versions. In an example, a user requests to access a program and a new and/or modified version of the program is stored as a clone in a different repository located in a different country from the original or master version of the program.

Figure 7:
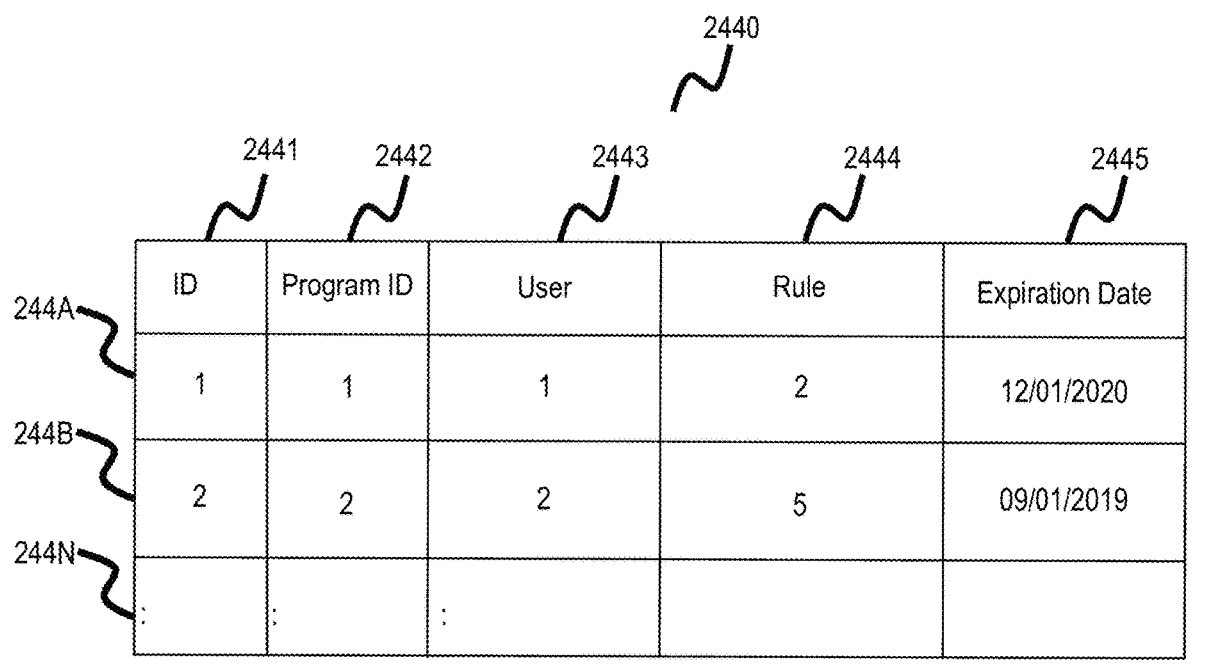

FIG. 7 illustrates an example application table 2440 in accordance with an example implementation. Application table 2440 includes column 2441 that shows an ID of the application, column 2442 that shows an ID of the program which is the target of the application, column 2443 that shows a user who is to be authorized to access the program, column 2444 that shows the rules which are required to share the program, and column 2445 that shows an expiration date of the application.

In some examples the user can submit the request for access, and in other examples the request can come from a third party (e.g., co-worker, manager, support staff, etc.) for access by the user in 2443. In an example, row 244A shows application ID 1, program ID 1, user 1, rule 2, expiration date 12/01/2020. User table 2420 of FIG. 3 indicates in row 242A that user 1 has location in column 2424 is USA and nationality in column 2425 is USA. Program table 2430-A of FIG. 6 indicates in row 243A that program ID 1 has access location of USA, JP in column 2434 and source location JP in 2437. Rule table 2410 of FIG. 4 indicates in row 241B that rule 2 has source location JP in column 2412 and destination location USA in column 2413 to apply checklist B and workflow B.

The ID of the program in column 2442 is associated with the ID of the program in column 2431 of FIG. 6. The user ID of column 2443 is associated with the ID of the user in column 2421 of the user table 2420 in FIG. 3. The rule value of column 2444 is associated with the ID of the rule in column 2411 of the rules table 2410 in FIG. 4.

The expiration date of the application in column 2445 can be pre-defined based on the application. The expiration date can be looked-up based on the rule. In an example implementation, the expiration date can be a relative time window measured from the time of the request or an absolute expiration date for the rule. For example, a user may be granted access for a relative time window of two weeks from the approved request.

In another example, a regulatory or business change can require an absolute expiration date for the rule to stop access at a particular date or blackout period. To extend access to the application, a new request can be processed. Each row (244A, 244B, 244N) shows the flow of each application template. For example, row 244A shows that application 1 is request from User 1 for sharing of program 1, and the expiration date of the application is 12/01/2020.

Figure 8:
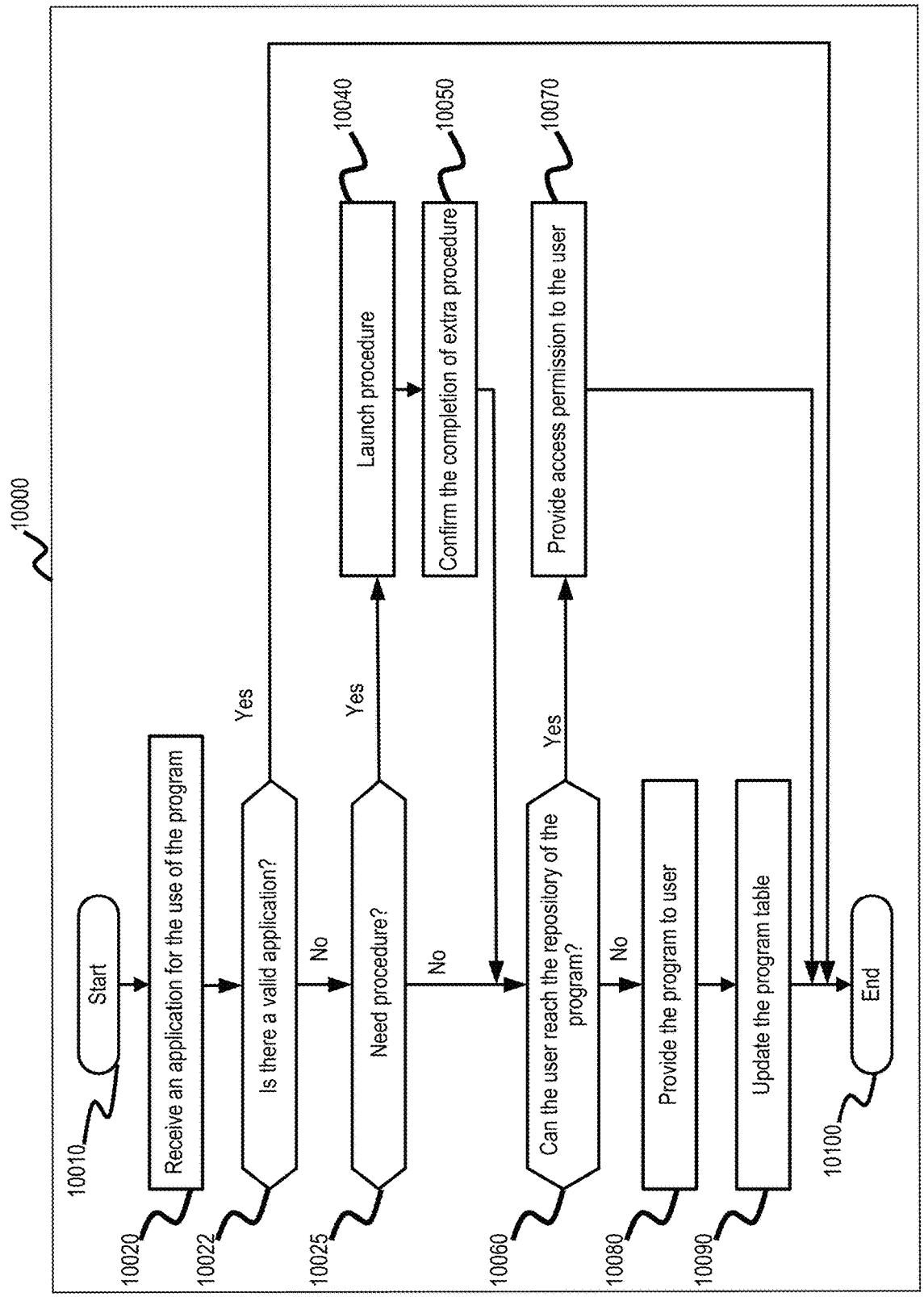
FIG. 8 illustrates an example flow of a procedure generator process in accordance with an example implementation.

FIG. 8 illustrates an example flow of a procedure generator process 2460 (e.g., procedure generator program 2460 of FIG. 2) in accordance with an example implementation. The procedure generator process 2460 is for creating a procedure to share a requested program. Procedure generator process 2460 accepts user input that (e.g., a request with information) that is submitted (e.g., via an interface) as an application for sharing of the program, provides a required procedure for sharing of the program based on rules, and shares the program with a user according to the status of the procedure. Procedure generator process 10000 allows a program to be registered with the application table 2440 of FIG. 7.

At step 10010, procedure generator process 2460 starts, for example, in response to a request for a user to access a networked program from an international source location. At step 10022, procedure generator process 2460 can receive a request to share the program via the self-service portal 1100. Information about the application, as discussed in reference to FIG. 7, are passed to the procedure generator process 2460.

At step 10022, procedure generator process 2460 judges whether there is a valid application or not based on the application table 2440. An application is valid if there is a previously stored entry that indicates one or more rules to be applied. A valid application is associated with a previously determined rule. If there is a valid application the result is yes, and then the process proceeds to step 10100.

For example, if an application for use of the program is between the JP and USA for program 1, then at 10022 the rule table 2410 of FIG. 4 and application table 2440 of FIG. 7 is checked to determine if there is a rule (e.g., row 241B indicating rule 2 for sharing between the JP and USA) that applies to the program (e.g., row 244A indicating program 1 is associated with rule 2) within a valid expiration period (e.g., column 2445 indicates expiration date 12/01/2020). Thus, the request with limited information can be processed at step 10022 to determine the valid application.

If there is not a valid application, the result is No, and then the process proceeds to step 10025. At step 10025, procedure generator process 2460 judges whether or not there are rules for the selected application based on the application information. The procedure generator process 2460 can use the checklist from column 2482 of the template table 2480 as illustrated in FIG. 5. The procedure generator process 2460 uses the program table 2430-A discussed in reference to FIG. 6 and the Export/Import rule table 2410 discussed in reference to FIG. 4. If there are no rules for the selected application, then the result is No indicating no procedure is needed and the process proceeds to step 10060.

If there are the necessary rules for the selected application, then the result is Yes indicating a procedure is needed and the process proceeds to step 10040. At step 10040, procedure generator process 2460 launches the procedure based on Export/Import rule table 2410 and template table 2480. For example, if rule 1 is required based on a source location in column 2437 of program table 2430-A and destination location in column 2424 of user table 2420, the procedure generator process 2460 applies the rule corresponding to row 241A of rule table 2410 to launch checklist "http://aaa.aaa.aaa . . . " and the workflow "http://bbb.bbb.bbb . . . " using the template table 2480.

At step 10050, procedure generator process 2460 confirms the completion of the procedure. At step 10060, procedure generator process 2460 judges whether the user can reach the repository of the program or not based on the user table 2420, program table 2430-A and application table 2440. The procedure generator process 2460 compares the corresponding access location in column 2434 of the program table 2430-A of FIG. 6 to the user location in column 2424 of user table 2420 of FIG. 3. In other example implementations, the procedure generator process 2460 can consider different user attributes based on requirements of a regulation as specified by a rule, for example the nationality of the user in column 2425 of user table 2420 of FIG. 3.

If the user can reach the repository of the program, then the result is Yes and the process proceeds to step 10070. At step 10070, procedure generator process 2460 provides an access permission for the program in version control system server 1500 to the user. If the user cannot reach the repository of the program, then the result is No and the process proceeds to step 10080.

In an example implementation, the procedure generator process 2460 at step 10060 determines the user cannot reach the repository of the program based on information in column 2434 of the program table 2430-A in FIG. 6 and then at step 10080, procedure generator process 2460 provides the program to the user as a clone. For example, access to the program can provided via a data copy to the user's version control system server 1500, via a cloud storage, remote connection, etc., but it is not limited to it. In an example, if the request is to share program 1 from source location JP with destination location of UK, program table 2430-A of FIG. 6 does not indicate the UK as an access location in column 2434 of row 243A for program ID 1.

If the request does not satisfy the access location list, a row can be added to the program table 2430-A to clone and add a new access location. To add an access location in column 2434 for a program in program table 2430-A of FIG. 6, a row is added to program table 2430-A with the program ID associated with a cloned repository type in column 2435.

At step 10090, procedure generator process 2460 updates the program table 2430-A based on information of the repository where the program is cloned (e.g., the repository where the program is copied). For example, program table 2430-A of FIG. 6 can have a new row 243D with program ID 1 in column 2431, a new repository URL in column 2433 for the repository location where the program is copied, with the cloned repository type in column 2435, and original program ID 1 in column 2436.

Successful completion of the process provides an authorized user access to the program and maintains records regarding the authorization process. At step 10100, procedure generator process 2460 quits the process.

Figure 9:
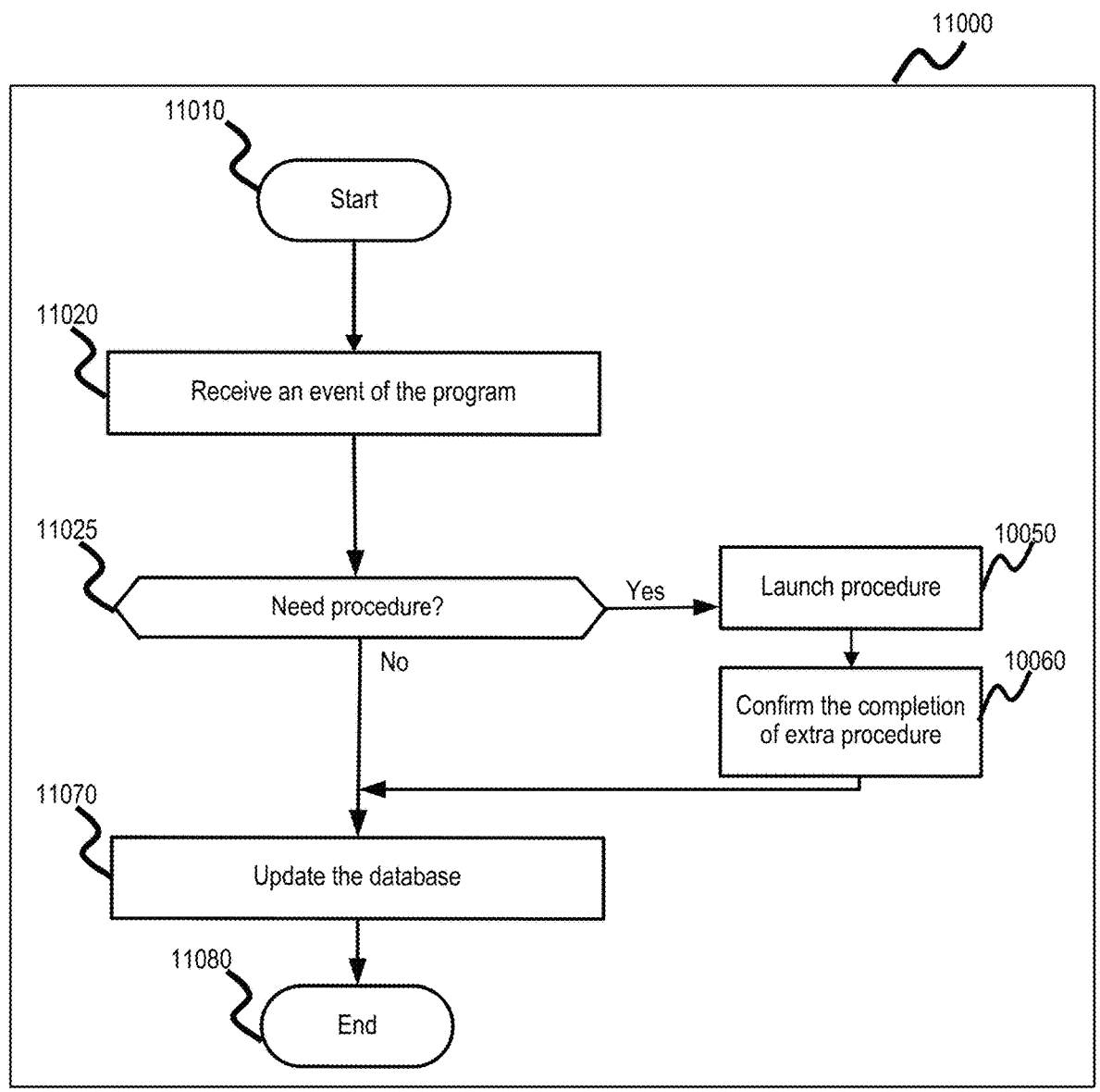
FIG. 9 illustrates an example flow of an event handler process in accordance with an example implementation.

FIG. 9 illustrates an example flow of an event handler process in accordance with an example implementation. The event handler program 2470 is used to create a procedure to share the program when the event about the program occurs. At step 11010, the event handler program 2470 starts. Event handler program 2470 detects an event about the program which version control system server 1500 manages and provides a required procedure based on rules and a type of the event.

At step 11020, the event handler program 2470 receives an event of the program and retrieves information based on the event from application table 2440 of FIG. 7. For example, event can include modifications to update, delete, copy, overwrite, etc. a program. A rule associated with an application can be determined based on column 2444 in application table 2440 of FIG. 7. The application table 2440 can be updated to associate a new rule with the program.

In an example implementation, information can be overwritten or appended to change the rules associated with a program in column 2444 in application table 2440 of FIG. 7. The rule to be applied is determined based on the destination location for the sharing and the source location of the program to be shared in view of the event information. For example, an event can include deletion of a program from the repository, and the program table 2430-A of FIG. 6 and the application table 2440 of FIG. 7 are updated to remove records (e.g., rows) associated with the deleted program.

At step 11025, the event handler program 2470 judges whether there are necessary rules for this event or not based on the rules in Export/Import rule table 2410 discussed in reference to FIG. 4. For example, row 241B in Export/Import rule table 2410 of FIG. 4 shows that a re-application is required when the program is modified. If the program is shared via a single repository, the user has to pass the procedure again based on Export/Import rule table 2410.

If there are the necessary rules for the event, then the result is Yes and the process proceeds to step 10050. Steps 10050 and 10060 are executed via the procedure generator process 2460 described in reference to FIG. 8. At 10050, procedure generator process 2460 confirms the completion of the procedure. At step 10060, procedure generator process 2460 judges whether the user can reach the repository of the program or not based on User table 2420, Program table 2430-A and Application table 2440. The procedure generator process 2460 uses the corresponding access location in column 2434 of the program table 2430-A as illustrated in FIG. 6.

If there are no rules that satisfy the event, then the result is No and the process proceeds to step 10070. At step 11070, the event handler program 2470 updates the databases. For example, if a new procedure is completed, then application table 2440 is updated. If the program is deleted, then the program table 2430-A is updated (e.g., remove, delete, flag as unavailable, etc.) to reflect that the program is not available. At step 11080, the event handler program 2470 quits or ends the process.

In an example, a request with minimal information for a user to access a program can be received via the self-service portal 1110 by leveraging information in the application database 1300, the rule database 1400, and the version control system server 1500 using management program 1200 to enforce rules and policies (e.g., Export/Import rules). In response to the request for the user to access the program, policies and regulations can be enforced via the rules to automate a checklist and workflow of approvals. Approval to share the program with the user can carried out efficiently with minimal information provided by the requestor to allow managers in the workflow to quickly and confidently complete any checklists for the request. Further, the management program 1200 maintains user, application, and program records to ensure compliance with the various policies and regulations.

Figure 10:
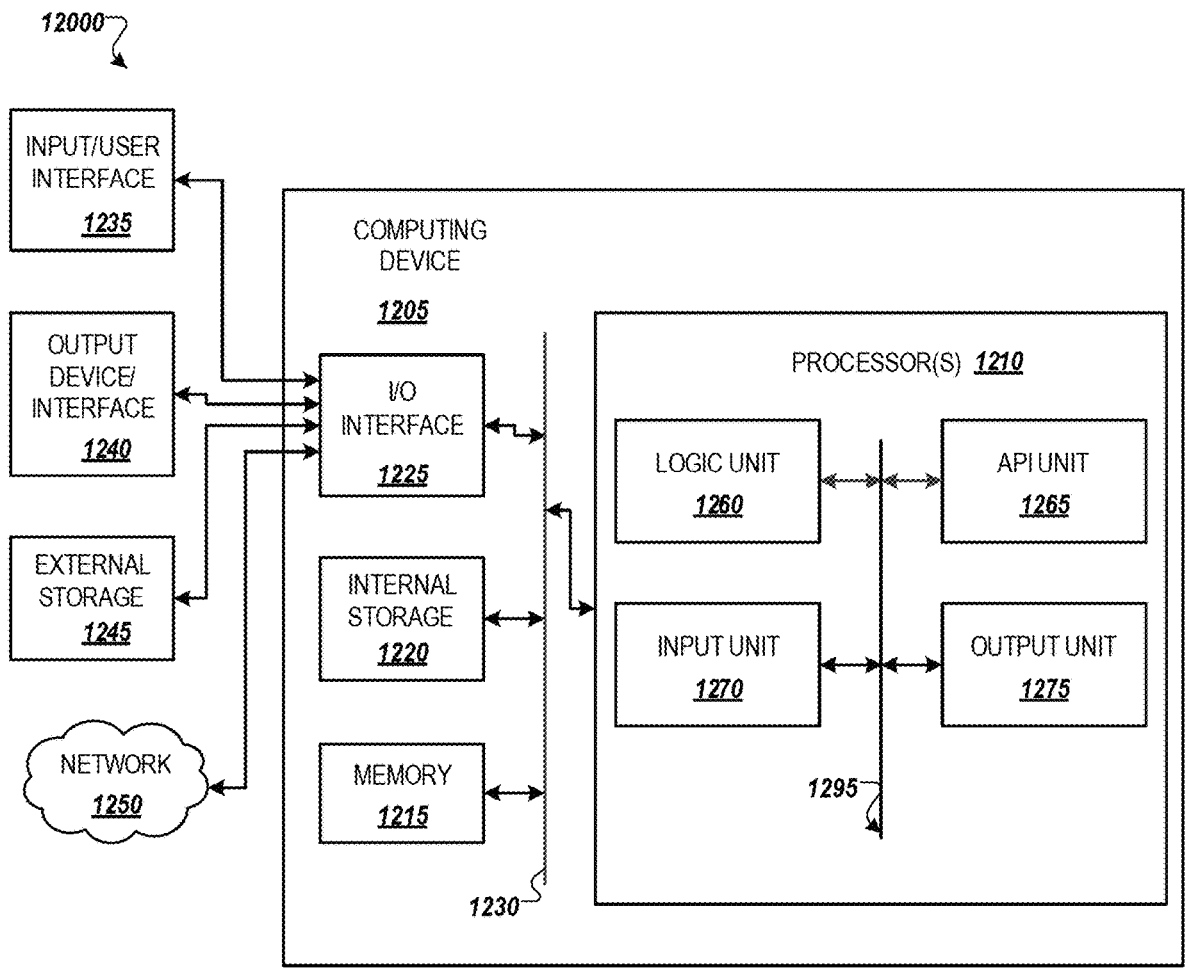
FIG. 10 illustrates an example computing environment with an example computer device suitable for use in some example implementations.

FIG. 10 illustrates an example computing environment 12000 with an example computer device suitable for use in some example implementations, such as a management program 1200 as illustrated in FIGS. 1-2. Computer device 1205 in computing environment 12000 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computer device 1205.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via I/O interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 12000. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "determining," "identifying," "checking," "allowing," "receiving," "requesting," "applying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The processor 1210 is configured to receive a request that includes program information and user information and identify a source location indicated by the program information as illustrated in FIG. 6 at 2430-A and a destination location indicated by the user information as illustrated in FIG. 3 at 2420 and FIG. 8 at 10020. The processor 1210 is configured to determine a rule type based on the source location and the destination location, determine a rule for the program based on the source location, the destination location, and the rule type, apply a procedure to approve access based on the rule, and allowing access to the program based on successful completion of the procedure as illustrated in FIG. 4 at 2410 and FIG. 8 at 10025, 10040, 10050, 10060, and 10070.

The processor 1210 is configured to execute the procedure that indicates a checklist and a workflow associated with the rule, and successful completion of the procedure can include obtaining a sequence of approvals for the checklist based on the workflow, as illustrated in FIG. 5 at 2580 and FIG. 8 at 10025 and 10040, and 10050. The processor 1210 is configured to determine successful completion of the procedure that indicate compliance with one or more regulations for a user to access the program between the source location and the destination location as illustrated in FIG. 4 at 2410 and FIG. 8.

The processor 1210 is configured to further use the procedure to configure the program for access in the destination location based on the user information and can receive program attributes from a version control system used to configure the program as illustrated in FIG. 1A and FIG. 8 at 1080.

In another example implementation the processor 1210 is configured to receive an event of a program and a program identifier, and in response to receiving the event of the program and program identifier: determining a rule assigned to the program based on the program identifier and an application table in view of an event type for the event, applying a procedure to approve access based on the rule, and allowing access to the program based on successful completion of the procedure as illustrated in FIG. 9.

In an example, the processor 1210 is configured to determine a version of the program indicated by the program identifier, and the event type can indicate to modify, copy, or delete the version of the program as illustrated in FIG. 9 and FIG. 7 at 2440. The processor 1210 is configured to update a program table based on the configuration as illustrated in FIG. 6 at 2430-A. The processor 1210 can be configured to use the procedure to configure the program for a user, where a destination location is determined based user information of the user from a user table illustrated in FIG. 3 at 2420, and where a source location is determined based on the program identifier in view of a program table illustrated in FIG. 6 at 2430-A. The processor 1210 is configured to update the application table based on the event and determine whether to re-apply the procedure based on the event type as illustrated in FIG. 7 at 2440 and FIG. 9 at 11070.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for access management of programs comprising:
in response to receiving a request from a user that comprises program information and user information:
identifying a source location and an access location of a program indicated by the program information and a destination location indicated by the user information, the source location of a program being a geographic location where the program was designed or is currently stored, the access location being a geographic location where the program can be accessed, and the destination location being a geographic location of the user;
determining that the program is valid based on one or more rules being associated with the program;
determining a rule type based on the source location and the destination location;
determining a rule for the program based on the source location, the destination location, and the rule type;
applying a procedure to approve access to the program based on the rule;
determining whether the program can be accessed based on the destination location indicated by the user information and the access location;
if the program can be accessed based on the access location, and can be accessed at the destination location:
configuring the program, by the procedure, for access at the destination location indicated by the user information, and
allowing access to the program at the destination location based on successful completion of the procedure, and
updating, by the procedure, a program table with the program configuration; and
if the program can be accessed based on the access location, but cannot be accessed at the destination location:
providing a clone of the program based on successful completion of the procedure, and
updating the program information in the program table with an indication that the clone was provided to the destination location indicated by the user information.

2. The method of claim 1, further comprising receiving program attributes from a version control system to configure the program.

3. The method of claim 1, wherein successful completion of the procedure indicates compliance with one or more regulations for a user to access the program between the source location and the destination location.

4. The method of claim 1, wherein the procedure indicates a checklist associated with the rule.

5. The method of claim 4, wherein successful completion of the procedure comprises obtaining a sequence of approvals for the checklist.

6. The method of claim 1, wherein successful completion of the procedure comprises obtaining one or more approvals based on a workflow associated with the rule.

7. The method of claim 6, wherein the workflow comprises an approval sequence for obtaining the one or more approvals.

8. The method of claim 1, wherein the rule indicates a re-application of the procedure based on an event type.

9. A method for access approval to networked programs comprising:

in response to receiving an event of a program and a program identifier:
- determining a geographic destination location of a user based on user information related to the user included in a user table;
- determining a source location and an access location of the program, included in a program table, based on the program identifier, the source location of the program being a geographic location where the program was designed or is currently stored and the access location being a geographic location where the program can be accessed;
- determining that the program is valid based on one or more rules associated with the program;
- determining a rule assigned to the program based on the program identifier and an application table, the source location, and the geographic destination;
- applying a procedure to approve access to the program based on the rule;
- determining whether the program can be accessed based on the geographic destination location and the access location;
- if the program can be accessed based on the access location, and can be accessed at the geographic destination location:
  - configuring the program for the user, by the procedure, for access at the geographic destination location, and
  - allowing access to the program at the geographic destination location based on successful completion of the procedure, and
  - updating, by the procedure, the program table with the program configuration; and
- if the program can be accessed based on the access location, but cannot be accessed at the geographic destination location:
  - providing a clone of the program based on successful completion of the procedure, and
  - updating the program information in the program table with an indication that the clone was provided to the geographic destination.

10. The method of claim 9, wherein the program identifier indicates a version of the program, and the event type indicates to modify, copy, or delete the version of the program.

11. The method of claim 9, further comprising updating the application table based on the event.

12. The method of claim 9, further comprising determining whether to re-apply the procedure based on the event type.

13. The method of claim 9, wherein successful completion of the procedure indicates compliance with one or more regulations for the user to access the program between the source location and the destination location.

14. A non-transitory computer-readable medium storing instructions for a policy based network application management system including a processing device configured to:
- identify a source location and an access location of a program indicated by program information and a destination location indicated by user information, the source location of a program being a geographic location where the program was designed or is currently stored the access location being a geographic location where the program can be accessed, and the destination location being a geographic location for a user;
- determine that the program is valid based on one or more rules being associated with the program;
- determine a rule type based on the source location and the destination location;
- determine a rule for the program based on the source location, the destination location, and the rule type;
- apply a procedure to approve access to the program based on the rule;
- determining whether the program can be accessed based on the destination location indicated by the user information and the access location;
- if the program can be accessed based on the access location, and can be accessed at the destination location:
  - configure the program, by the procedure, for access at the destination location indicated by the user information, and
  - allow access to the program at the destination location based on successful completion of the procedure;
  - updating, by the procedure, a program table with the program configuration; and
- if the program can be accessed based on the access location, but cannot be accessed at the destination location:
  - provide a clone of the program based on successful completion of the procedure, and
  - update the program information in the program table with an indication that the clone was provided to the destination location indicated by the user information.

15. The non-transitory computer-readable medium of claim 14, wherein the procedure indicates a checklist and a workflow associated with the rule, wherein successful completion of the procedure comprises obtaining a sequence of approvals for the checklist based on the workflow.

16. The non-transitory computer-readable medium of claim 14, wherein successful completion of the procedure indicates compliance with one or more regulations for the user to access the program between the source location and the destination location.

* * * * *